United States Patent
Ala-Vannesluoma (10) Patent No.: US 8,638,813 B2
(45) Date of Patent: Jan. 28, 2014

(54) PROTOCOL PARAMETER NEGOTIATION

(75) Inventor: Jukka Ala-Vannesluoma, Tampere (FI)

(73) Assignee: Nokia Corporation, Espoo (FI)

( * ) Notice: Subject to any disclaimer, the term of this patent is extended or adjusted under 35 U.S.C. 154(b) by 1209 days.

(21) Appl. No.: 11/587,523

(22) PCT Filed: Apr. 28, 2004

(86) PCT No.: PCT/IB2004/001279
§ 371 (c)(1),
(2), (4) Date: Oct. 24, 2006

(87) PCT Pub. No.: WO2005/107208
PCT Pub. Date: Nov. 10, 2005

(65) Prior Publication Data
US 2007/0223524 A1    Sep. 27, 2007

(51) Int. Cl.
*H04J 3/16* (2006.01)
*G06F 15/173* (2006.01)
*G06F 15/16* (2006.01)

(52) U.S. Cl.
USPC ............ 370/466; 709/224; 709/227; 709/229

(58) Field of Classification Search
USPC ............. 370/464, 465, 466; 709/224; 714/4.9
See application file for complete search history.

(56) References Cited

U.S. PATENT DOCUMENTS

| | | | |
|---|---|---|---|
| 6,304,905 B1 * | 10/2001 | Clark | 709/224 |
| 6,434,133 B1 | 8/2002 | Haemaelaeinen | |
| 2002/0091831 A1 * | 7/2002 | Johnson | 709/227 |
| 2003/0149567 A1 * | 8/2003 | Schmitz et al. | 704/270 |
| 2004/0143670 A1 * | 7/2004 | Roychowdhury et al. | 709/229 |
| 2004/0192251 A1 * | 9/2004 | Zhao et al. | 455/404.1 |

FOREIGN PATENT DOCUMENTS

| | | |
|---|---|---|
| JP | 10-271305 | 10/1998 |
| JP | 2002-533808 | 10/2002 |
| JP | 2003-515995 | 5/2003 |
| WO | WO 01/65779 | 9/2001 |

OTHER PUBLICATIONS

"$3^{rd}$ Generation Partnership Project; Technical Specification Group Core Network; Radio Link protocol (RLP) for circuit switched bearer and teleservices (Release 5)"; 3GPP TS 24.022 V5.4.0 (Sep. 2003).

* cited by examiner

*Primary Examiner* — Brandon Renner
(74) *Attorney, Agent, or Firm* — Mintz, Levin, Cohn, Ferris, Glovsky & Popeo, P.C.

(57) ABSTRACT

This invention relates to a method for negotiating at least one parameter of a protocol that is operated between a first protocol entity (1) and a second protocol entity (2), comprising receiving (301) a first negotiation message (3) that carries a first value for the at least one parameter, wherein the first value is an invalid value for the at least one parameter, and sending (309) a second negotiation message that carries a second value for the at least one parameter in response to the first negotiation message (3). The invention further relates to a computer program, a computer program product, a system (30) a terminal (10) and a network element (20). The protocol may for instance be a Radio Link Protocol, and the first (3) and second (4) negotiation messages may for instance be eXchange Identification XID command and response, respectively.

20 Claims, 4 Drawing Sheets

Fig.4

PROTOCOL PARAMETER NEGOTIATION

CROSS REFERENCE TO RELATED APPLICATIONS

This application is for entry into the U.S. national phase under §371 for International Application No. PCT/IB04/001279 having an international filing date of Apr. 28, 2004.

FIELD OF THE INVENTION

This invention relates to a method for negotiating at least one parameter of a protocol that is operated between a first protocol entity and a second protocol entity.

BACKGROUND OF THE INVENTION

In mobile radio systems of the second and third generation, such as for instance the Global System for Mobile Communications (GSM) and the Universal Mobile Telecommunications System (UMTS), Non-Transparent (NT) data bearers are provided that offer an error-free data transfer service to the user. The data transfer service is based on the Radio Link Protocol (RLP) and the Connection-Oriented Layer-2 Relay (L2R) Protocol (COP). The RLP function offers an Automatic Repeat Request (ARQ) protocol that extends from the mobile station (MS) to the network Interworking Functions (IWF) in the Mobile-services Switching Centre (MSC) in order to detect errors by means of a Forward Error Correction (FEC) procedure and RLP's Frame Check Sequence (FCS) for each transmitted RLP frame, where an RLP frame represents an RLP Protocol Data Unit (PDU), and to eliminate errors by repeating the transmission of the frame under exploitation of the time-variance of the transmission medium. The L2R function converts the layer-2 protocol of the MS into a COP that uses transmission protected by an RLP.

The RLP is controlled by several parameters such as acknowledgement, reply and re-sequencing timers or the number of retransmission attempts or required window sizes, that either are assigned default values or can be modified by the user or network e.g. by means of AT commands. These parameters are for instance defined in Table 2 of Technical Document TS 24.022 of the Third Generation Partnership Project (3GPP). If a change of parameters is initiated in either the MS RLP entity or the MSC RLP entity, the desired parameters are signalled to the corresponding peer RLP entity via eXchange IDentification (XID) frames, which are RLP frames (PDUs) in which the information field is interpreted as exchange identification instead of data. To start negotiation, an XID command frame will be signalled. The peer entity confirms the values of the parameters by returning the value within an XID response or offering lower or higher values of the parameters in their place depending on the sense of negotiation of the parameters.

Figure 1A:
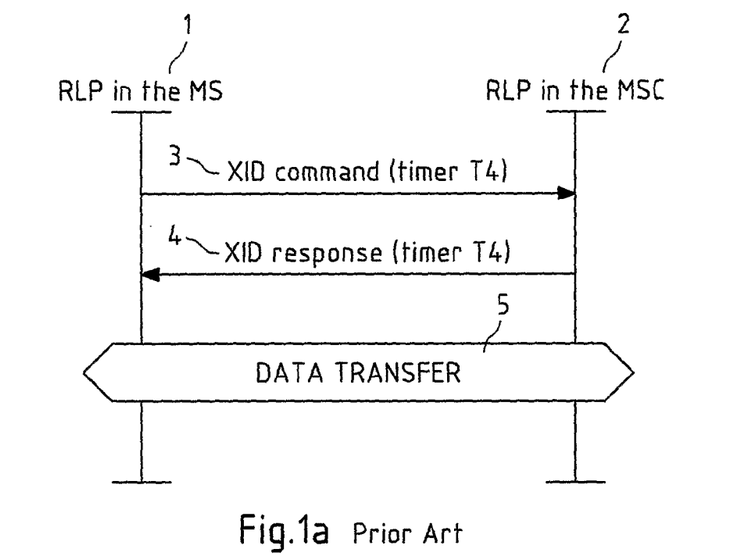

This negotiation procedure is exemplarily depicted in the signalling chart of FIG. 1a. In FIG. 1a, to establish a data transfer, an RLP entity 1 in the MS sends an XID command frame 3 with a proposed value for a parameter, in this example a proposed value for the re-sequencing timer T4, to its peer RLP entity 2 in the MSC. It should be noted that an XID command/response frame may be used for the negotiation of several parameters at a time. However, for the sake of simplicity of presentation, FIG. 1a only depicts a single parameter (the timer T4) to be negotiated. XID command/response frames may for instance further comprise an RLP version number, and/or may comprise a plurality of parameters that at least partially depend on each other. Turning back to the example of FIG. 1a, the value for the timer T4 may for instance be determined by a user of the MS via an AT command, and may be chosen as T4=60 ms. The RLP entity 2 in the MSC receives the XID command frame 3, extracts the proposed value for T4 and determines if this value is acceptable or has to be increased or decreased, depending on the sense of negotiation that is prescribed for the parameter. The accepted (T4=60 ms) or altered value (e.g. T4=80 ms as the sense of negotiation of T4 parameter allows negotiation only upwards) for the timer T4 then is returned to the MS RLP entity 1 by sending an XID response frame 4 that contains said accepted/altered value from the MSC entity 2 to the MS RLP entity 1. Further negotiation steps may take place for the parameter T4 or for other RLP parameters, until finally a data transfer 5 between the MS and the MSC can be established based on the RLP. It is understood that, prior to the start of the data transfer 5, Set Asynchronous Balanced Mode (SABM) and Unnumbered Acknowledgement (UA) frames may have to be exchanged between the peer entities 1 and 2. In FIG. 1a, this exchange is assumed to be lumped to the data transfer representation 5.

Figure 1B:
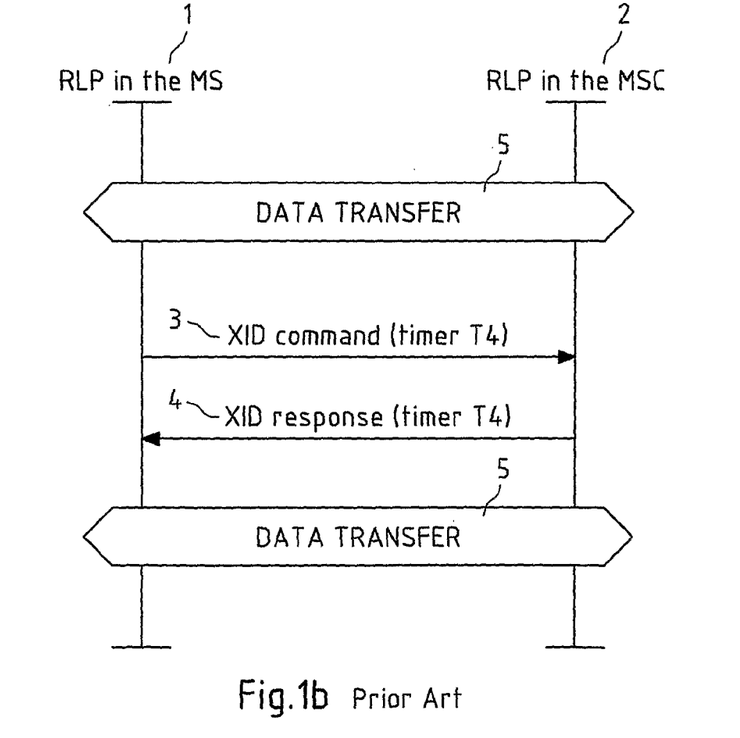

In FIG. 1b, a similar negotiation procedure is depicted. However, in contrast to the procedure of FIG. 1a, data transfer 5 is already taking place when the first XID command frame 3 with a proposal for a value of at least one parameter (e.g. the re-sequencing timer T4) is sent from the RLP entity 1 in the MS to the RLP entity 2 in the MSC, i.e. the parameter is re-negotiated during the data transfer 5. The RLP entity 2 in the MSC then either accepts or alters the proposed value for the parameter and returns the accepted/altered value within an XID response frame 4 that is returned to the RLP entity 1 of the MS. After this parameter re-negotiation, data transfer 5 can be continued based on the RLP and its re-negotiated RLP parameter. It should be noted that it is not necessarily required to interrupt the data transfer 5 for the parameter re-negotiation, re-negotiation may also take place in parallel to the data transfer 5.

In general, values for RLP parameters are limited to a respective range or alphabet that is prescribed by the RLP. For instance, the second column in table 2 of TS 24.022 defines the validity ranges for a plurality of RLP parameters. During negotiation, both the values for parameters proposed in XID command frames and the accepted/altered values in the XID response frames have to be valid values for said respective parameter, i.e. they have to lie within the validity range as defined by said RLP for each parameter. For instance, the RLP parameter P1 (dictionary size) has a validity range of 512-65535, so that a proposed value for P1 of 500 would be an invalid value.

However, due to different interpretations of RLP specifications by manufacturers of the MS and/or the MSC, or due to implementation errors, values for RLP parameters in XID command frames may be invalid, i.e. lie out of the validity ranges defined by the RLP specification. The consequence of the use of invalid values for the RLP parameters during their negotiation is usually a discarding of the received XID command frame by the entity that receives the XID frame with the invalid value, wherein either the entire XID frame (possibly containing values for a plurality of RLP parameters) or only the invalid value itself is discarded. The RLP entity that sent the XID command frame with the invalid value then most likely tries to send (re-transmit) the same XID command frame again a few times, because it does not receive an according XID response frame as acknowledgement. When the number of "maximum retransmits" is exceeded for the XID command frame, the RLP entity that tries to send the XID command frame with the invalid value for an RLP parameter may (depending on its implementation) even terminate the connection.

Figure 2:
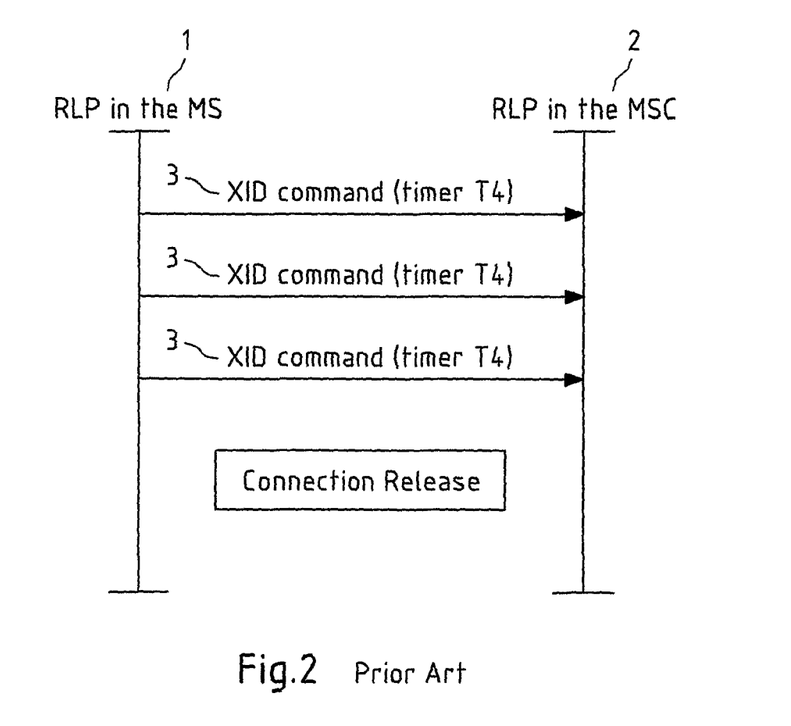
FIG. 2: a signalling chart of a terminated negotiation procedure due the proposal of an invalid parameter according to the prior art based on document "$3^{rd}$ Generation Partnership Project; Technical Specification Group Core Network; Radio Link protocol (RLP) for circuit switched bearer and teleservices (Release 5)"; 3GPP TS 24.022 V5.4.0 (September 2003)

This scenario is depicted in FIG. 2. The RLP entity 1 in the MS sends an XID command frame 3 with an invalid value for a parameter (e.g. the re-sequencing timer T4) to its RLP peer entity 2 in the MSC. The RLP entity 2 in the MSC now detects the invalid value in the XID command frame 3 and discards the complete XID command frame 3. After the expiration of a timer that controls the time window in which a response to the XID command frame 3 has to be received, the RLP entity 1 in the MS notices that no XID response frame 4 was received from the RLP entity 2 in the MSC, and thus re-transmits the XID command frame 3 with the invalid value again, leading again to a discarding of the XID command frame 3 due to the invalidity of the value contained therein at the RLP entity 2 in the MSC. This procedure continues until a number of maximum re-transmits in the RLP entity 1 of the MS is exceeded. The RLP entity 1 in the MS then may decide to release the connection, as none of the XID commands were responded to and as no further transmissions of XID command frames are allowed.

SUMMARY OF THE INVENTION

In view of the above-mentioned problem encountered in the context of the Radio Link Protocol, it is, inter alia, an general object of the present invention to provide a method, a computer program, a computer program product, a system, a terminal and a network element for a more robust negotiation of at least one parameter of a protocol that is operated between a first protocol entity and a second protocol.

A method is proposed for negotiating at least one parameter of a protocol that is operated between a first protocol entity and a second protocol entity, the method comprising receiving a first negotiation message that carries a first value for said at least one parameter, wherein said first value is an invalid value for said at least one parameter; and sending a second negotiation message that carries a second value for said at least one parameter in response to said first negotiation message.

Said protocol may be any protocol that allows said first and second entity to exchange data. Said exchange may be accomplished by sending and receiving PDUs between said first and second entity, wherein the physical transmission of said PDUs is accomplished by underlying protocols. Said protocol may provide services to higher layer protocols. For instance, said protocol may be an RLP that offers an ARQ service for connections between a MS and an MSC of a mobile communications system, wherein said first and second entity then may be logically associated with said MS and said MSC, respectively.

Said protocol comprises at least one parameter. Said parameter may for instance be required for the operation or said protocol, or may enhance its performance. If said protocol is an RLP, said parameter may for instance be a re-sequencing timer, a maximum number of re-transmissions or a data compression parameter. Said first and second values are intended for assignment to said at least one parameter of said protocol, for instance said values may be numerical values for said parameter such as "40 ms" for a re-sequencing timer.

Said negotiation may either be an initial negotiation of a parameter, or it may be a re-negotiation of a parameter, wherein an initial value for said parameter that was used before said re-negotiation may for instance be a default value and wherein said re-negotiation may for instance be triggered by an external event or by user interaction.

Said negotiation comprises receiving a first negotiation message that carries a first value for said at least one parameter. Said first negotiation message may equally well contain several values of several respective parameters that are to be negotiated. Said value may for instance be a number, a symbol, a letter, or any other representation of information. Said first negotiation message may for instance be sent from said first entity to said second entity. Said first value may for instance be a proposal of a value for said at least one parameter, for instance a default value that can be supported by said entity that proposes said first value. Said first value is an invalid value, i.e. said value is not allowed by said protocol. For instance, if said at least one parameter can be represented by a number, said protocol may define a validity range of numbers that can be used as a value for said at least one parameter. Alternatively, if said at least one parameter can be represented by a symbol, said protocol may define a limited alphabet of symbols that can be used as values for said at least one parameter.

Although said first negotiation message contains an invalid value for said at least one parameter, a second negotiation message is sent in response to said first negotiation message, for instance from said second entity to said first entity, wherein said second negotiation message contains a second value for said at least one parameter. Thus said negotiation is not interrupted or terminated by the sending of said first negotiation message with said invalid value for said at least one parameter. Said second value may for instance be the same value as the first value, or may be transformed into a valid value, for instance by an entity that received said first negotiation message.

In contrast to prior art, thus according to the present invention a negotiation of at least one parameter is not interrupted or terminated by sending a negotiation message that contains an invalid value for said at least one parameter. Instead, said first negotiation message is responded with a second negotiation message that contains a second value for said at least one parameter. This second negotiation message keeps up the negotiation procedure and thus makes both the negotiation and the protocol more robust. In particular, increased robustness is achieved in the case when the first entity that has sent the first negotiation message with the invalid first value is waiting for a response (the second negotiation message), which is not given in prior art techniques due to the invalidity of the first value, so that the first entity has to wait until a waiting timer expires and then re-transmits the first negotiation message with the invalid value again. Even worse, if a maximum number of re-transmissions is exceeded, the first entity may decide to cancel the entire connection. This blocking of the first entity, the frequent re-transmissions, which are useless due to the fact that in every re-transmission, the same invalid value is used, and the potential release of the entire connection is avoided by the present invention. Furthermore, for the present invention, the reason for the proposal of invalid values in the first negotiation messages, e.g. different interpretation of the protocol standards or implementation errors, is irrelevant. As a further advantage, the present invention is easily implemented and may not require significant changes to existing implementations.

A preferred embodiment of the present invention further comprises checking if a sense of negotiation of said at least one parameter allows to negotiate said invalid first value into a valid value. If said first value is a number, said sense of negotiation may for instance prescribe that if in a first negotiation message, a value v1 was proposed, in a second negotiation message, which is sent in response to said first negotiation message, only a value v2 can be used that is equal to or larger than v1 in case of up-negotiation, or equal to or smaller than v1 in case of down-negotiation. Similar senses of negotiation may be defined for values of said at least one parameter that are symbols or letters, for instance by referring to the sequence of symbols or letter in a validity symbol or letter alphabet that defines the valid symbols or letters. Said negotiation sense may for instance be defined by said protocol. If said sense of negotiation allows to negotiate said first (invalid) value into a valid value, this value may be included as said second value in said second negotiation message and then be the final or intermediate result of the negotiation of said at least one parameter. For instance, if the first (invalid) value of said at least one parameter is smaller than the lower border of the validity range for the values of said parameter, and if the sense of negotiation is upwards, then the second value may be chosen as the lower border of said validity range, as a default or recommended value within said validity range, or as a value selected by a user.

A preferred embodiment of the present invention further comprises checking if said at least one parameter is required for the operation of said protocol. In case said at least one parameter is not required for the operation of said protocol, said second value may for instance be chosen equal to said first (invalid) value, because it is not required anyway. However, the negotiation procedure is not interrupted or terminated by acknowledging said invalid first value in this way. Alternatively, said second value may still be turned into a valid value before responding to said first negotiation message. A parameter is understood to be not required for the operation of said protocol if at least a basic operation of said protocol is still possible without a proper choice of said parameter. Such non-required parameters may for instance be performance-enhancing parameters, optional parameters, or parameters that become redundant in dependence on the current choice of other parameters.

According to a preferred embodiment of the present invention, said second value is a valid value for said at least one parameter. The negotiation then may be successfully finished or further continued based on said valid second value, and no interruption or unsuccessful termination of the negotiation with performance degradation of further protocols and services that depend on said protocol occurs.

According to a preferred embodiment of the present invention, said second value equals said first value. Then the second value may be invalid as well. This simple choice of the second value does not require sophisticated negotiation effort at the entity that receives the first negotiation message and may send the second negotiation message. However, the negotiation procedure is not interrupted, and if said at least one parameter is a non-required parameter, no performance degradation of further protocols and services that depend on said protocol occurs due to said invalid first value.

According to a preferred embodiment of the present invention, said protocol is a Radio Link Protocol that at least partially controls a data transmission between a mobile station and a mobile-services switching centre. Said first negotiation message then may be an eXchange IDentification XID command, and said second negotiation message then may be an XID response.

A computer program is further proposed with instructions operable to cause a processor to perform the above-mentioned method steps. Said computer program may for instance be executed in a processor of a device, for instance in a processor of an MS or an MSC.

A computer program product is further proposed comprising a computer program with instructions operable to cause a processor to perform the above-mentioned method steps. Said computer program product may for instance be stored in chip memory such as for instance a cache, a Random Access Memory (RAM) or a (Read Only Memory) ROM of a device, or may be stored on a storage medium such as for instance a memory card, memory stick or disc.

A system is further proposed for negotiating at least one parameter of a protocol that is operated between a first protocol entity and a second protocol entity, the system comprising means arranged for receiving a first negotiation message that carries a first value for said at least one parameter, wherein said first value is an invalid value for said at least one parameter; and means arranged for sending a second negotiation message that carries a second value for said at least one parameter in response to said first negotiation message.

A terminal of a communication system is further proposed, in which at least one parameter of a protocol that is operated between a protocol entity in said terminal and a protocol entity in a network is negotiated, the terminal comprising means arranged for receiving a first negotiation message that carries a first value for said at least one parameter, wherein said first value is an invalid value for said at least one parameter; and means arranged for sending a second negotiation message that carries a second value for said at least one parameter in response to said first negotiation message. Said terminal may for instance be a MS of a mobile communication system.

A network element of a communication system is further proposed, in which at least one parameter of a protocol that is operated between a protocol entity in a terminal and a protocol entity in said network element is negotiated, the network element comprising means arranged for receiving a first negotiation message that carries a first value for said at least one parameter, wherein said first value is an invalid value for said at least one parameter; and means arranged for sending a second negotiation message that carries a second value for said at least one parameter in response to said first negotiation message. Said network element may for instance be included in a MSC of a mobile communication system.

These and other aspects of the invention will be apparent from and elucidated with reference to the embodiments described hereinafter.

BRIEF DESCRIPTION OF THE FIGURES

In the figures show:

FIG. 1 $a$: A signalling chart of a first exemplary negotiation procedure according to the prior art based on document "$3^{rd}$ Generation Partnership Project; Technical Specification Group Core Network; Radio Link protocol (RLP) for circuit switched bearer and teleservices (Release 5)"; 3GPP TS 24.022 V5.4.0 (September 2003);

FIG. 1 $b$: a signalling chart of a second exemplary negotiation procedure according to the prior art based on document "$3^{rd}$ Generation Partnership Project; Technical Specification Group Core Network; Radio Link protocol (RLP) for circuit switched bearer and teleservices (Release 5)"; 3GPP TS 24.022 V5.4.0 (September 2003);

DETAILED DESCRIPTION OF THE INVENTION

In the following part of this specification, embodiments of the present invention will be presented for the exemplary case of parameter negotiation in the context of the Radio Link Protocol (RLP). It should however be noted that the present invention allows for a robust parameter negotiation also in other types of protocols and is by no means intended to be restricted to the embodiments presented herein.

The present invention proposes to respond to a negotiation message even if it contains an invalid value proposal for a parameter.

Thus a scenario as illustrated in FIG. 2 for the exemplary case of parameter negotiation in the context of the RLP protocol, wherein an XID command frame 3 containing an invalid parameter is repeatedly discarded by a receiving RLP entity 2 and wherein said repeated discarding of said XID command frame 3 forces the sending RLP entity 1 to release the RLP connection between the peer entities may no longer occur.

Instead, the negotiation procedure according to the present invention may take place as illustrated in FIGS. 1a and 1b, with the difference that the value for the at least one parameter contained in the XID command frame 3 of FIGS. 1a and 1b then is an invalid value. Consequently, as in FIGS. 1a and 1b, according to the present invention, the XID command frame 3 is responded with an XID response frame 4 although the proposed value for the at least one parameter such as the re-sequencing timer T4 is invalid.

According to a preferred embodiment of the present invention, upon reception of an XID command frame with an invalid value for an RLP parameter, it is checked if the sense of negotiation of the parameter in question allows the negotiation to a valid value. If the negotiation was triggered by user interaction, or if a user has selected a preferred choice for said parameter before, the value given by the user may be the goal of the negotiation, and the value for said parameter in the XID response frame may be chosen accordingly.

For instance, if a user has changed a value for the re-sequencing timer T4 to 100 ms at a MS (T4 value range: >25 ms according to TS 24.022; sense of negotiation is upwards), and if an XID command frame is then received from an RLP entity in a MSC, wherein T4 is set to 20 ms in said XID command frame (illegal value), the T4 value is set to 100 ms in the XID response frame that is sent back from the RLP entity of the MS to the RLP entity of the MSC.

Alternatively or in addition to the step of checking the sense of negotiation of the parameter in question in said preferred embodiment, it may be checked whether the parameter in question is required for the RLP connection or not. Then invalid values for parameters may be accepted during negotiation if they are not required for the RLP connection. If a peer RLP entity proposes such an invalid value for a parameter that is not needed in the connection, the values can either be negotiated to a legal value, if the sense of negotiation allows it, or, alternatively, they can be accepted as such regardless of their validity. In the latter case, the sense of negotiation is thus not an obstacle.

For instance, a peer RLP sends an XID command frame with the following compression parameters:
Compression: V. 42bis
Direction: None
Dictionary size: 0 (according to TS 24.022, the allowed range is 512-65535; the sense of negotiation is downwards)
Max string length: 0 (according to specification, allowed range is 6-250; the sense of negotiation is downwards)

In this case, the dictionary size and the maximum string length cannot be negotiated to a valid value, because the respective sense of negotiation is downwards and, in order to get valid values, the proposed values would have to be increased. But as the compression direction is set to "none", i.e. compression is not used, the parameters dictionary size and max string length are not needed for the operation of the RLP protocol and thus the parameters can be accepted as such. Consequently, the same values as the proposed values are returned in the XID response frame.

Figure 3:
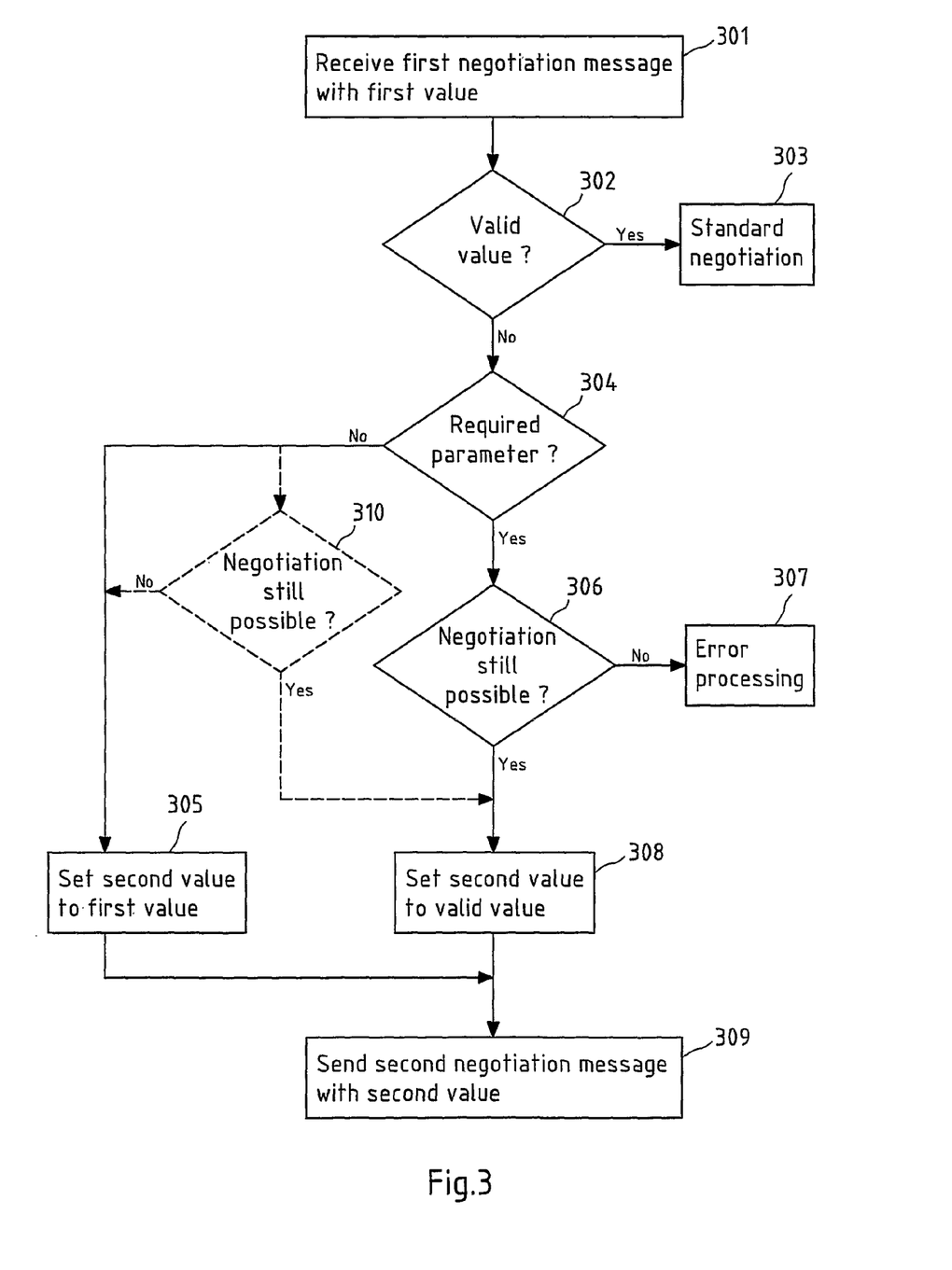
FIG. 3: an exemplary flowchart of a method according to a preferred embodiment of the present invention.

FIG. 3 is an exemplary flowchart of a method according to a preferred embodiment of the present invention. In a first step 301, a first negotiation message (for instance an XID command frame in case of the RLP protocol) is received, wherein said first negotiation message contains a first value for a parameter of a protocol (for instance a value for the re-sequencing timer T4 of the RLP protocol). In a step 302, it is then checked if this first value is a valid value or not (for instance, in case of the RLP protocol, the validity range of the timer T4 may be checked from TS 24.022). If the first value turns out to be a valid value, in a step 303 standard negotiation processing is entered as it is well-known in prior art. For instance, in case of the RLP protocol, an XID response frame may then be sent with an accepted or altered value, wherein said acceptance or altering of said value is determined by some kind of negotiation instance. If the first value turns out to be an invalid value, it is checked in a step 304 if the parameter the value refers to is required for the protocol or not. If it is not required, a second value is set equal to the first value in a step 305, and a second negotiation message with said second value (indicating acceptance of the first value) is sent. If the parameter is required, it is checked in a step 306 if a prescribed sense of negotiation for said parameter allows to negotiate said first invalid value into a valid second value. If this is not possible, an error processing procedure 307 is entered, which may for instance comprise sending an error message to an error handler, or releasing a protocol connection, or similar. If negotiation of said first value into a valid second value is possible, this is prepared in a step 308, where the second value is set to a valid value, which then is sent within a second negotiation message in a step 309. FIG. 3 also depicts an alternative implementation (given in dashed lines) for the case that the first value is an invalid value (step 302), but that the parameter the first value refers to is not required for the protocol (step 304). Instead of accepting the first value as it is (step 305), it may be checked in a step 310 if a prescribed sense of negotiation for said parameter allows to negotiate said first invalid value into a valid second one. If this is possible, the method proceeds with step 308. Otherwise, the method proceeds with step 305.

Figure 4:
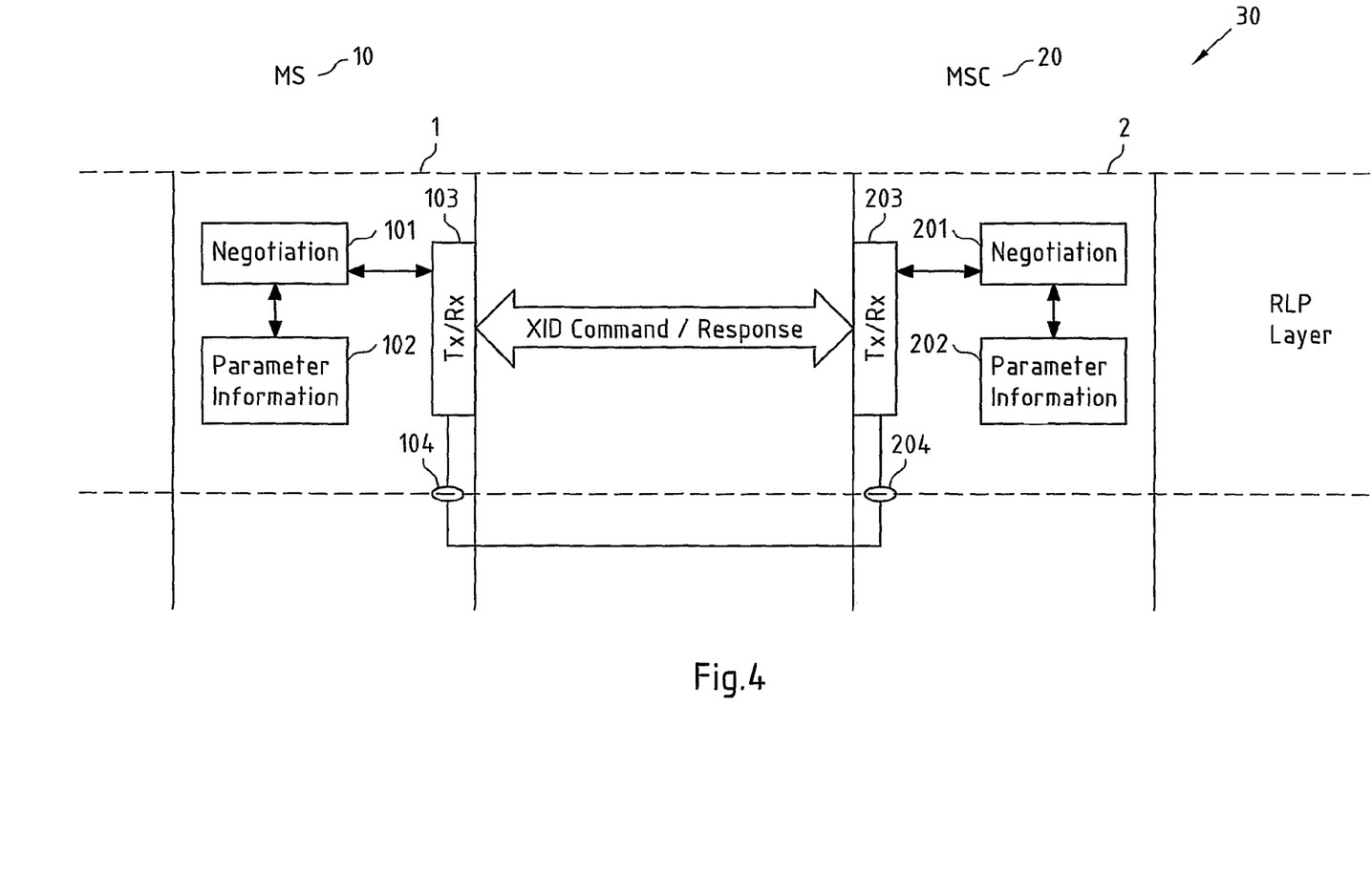
FIG. 4: a schematic view of the logical components of a system according to the present invention.

FIG. 4 schematically depicts the logical components of a system 30 according to the present invention. The system is composed of a MS 10 and a MSC 20, of which only the MS RLP entity 1 and the MSC RLP entity 2, both residing in the RLP layer, are shown. The protocol layers below the RLP layer are only shown in simplified manner. The MS RLP entity 1 comprises a negotiation instance 101, a parameter information database 102, and a sending/receiving interface 103.

The sending/receiving interface 103 is capable of logically sending and/or receiving XID frames within the RLP layer, wherein for the actual physical transport of these XID frames, the XID frames are transferred via a service access point 104 to lower protocol layers that provide a frame transport service for the RLP layer.

The negotiation instance 101 performs the negotiation of RLP parameters between the peer RLP entities in the MS and the MSC. For instance, said negotiation instance 101 in said MS RLP entity 1 may initiate a parameter negotiation step by consulting the parameter information base 102 for a default or recommended value for a certain parameter, or for a value that has been chosen by a user, and sending this default/recommended/chosen value to its peer entity 2 as an XID command frame via the sending/receiving interface 103.

Similarly, upon reception of an XID command frame from the peer RLP entity 2 via the sending/receiving interface 103, said negotiation instance 101 may consult the parameter information database 102 to determine if a proposed value in said XID command frame is a valid value, if it can be upwards or downwards negotiated and if this parameter is currently required for the RLP protocol.

Depending on the outcome of this consultation, the negotiation instance 101 then may trigger the sending of an XID response frame that contains an appropriately chosen value for the at least one parameter that is currently negotiated, even if the proposed value for said at least one parameter in said received XID command frame was invalid. It is readily seen that the logical components 201, 202, 203 and 204 in the MSC RLP entity 2 serve exactly the same function as their counterparts in the MS RLP entity 1.

The present invention has been described above by means of preferred embodiments. It should be noted that there are alternative ways and variations which are obvious to a skilled person in the art and can be implemented without deviating from the scope and spirit of the appended claims. In particular, the present invention is not limited to application in the context of the RLP protocol, it may equally well be applied in all types of protocols in which parameter negotiation occurs, regardless whether these protocols are used in wired or wireless communication systems.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method comprising:
receiving a first negotiation message from a first protocol entity that carries a first value for at least one parameter of a protocol that is operated between said first protocol entity and a second protocol entity, wherein said first value is an invalid value for said at least one parameter, and wherein said invalid value is not allowed by said protocol;
checking whether said at least one parameter is required for operation of said protocol; and
sending a second negotiation message to said first protocol entity that carries a second value for said at least one parameter in response to receiving said first negotiation message, wherein said second negotiation message is configured to prevent a termination or an interruption of a negotiation of said at least one parameter of said protocol that is operated between said first protocol entity and said second protocol entity,
wherein said second value is set to a value representative of said first value when said at least one parameter is not required for said operation of said protocol.

2. The method according to claim 1, wherein said first value is a default value or a user-defined value for said at least one parameter.

3. The method according to claim 1, further comprising:
checking whether said first value for said at least one parameter may be negotiated from said invalid value to a valid value, wherein said valid value is allowed by said protocol.

4. The method according to claim 1, wherein said protocol is a radio link protocol.

5. The method according to claim 4, wherein said first negotiation message is an exchange identification command, and wherein said second negotiation message is an exchange identification response.

6. The method according to claim 3, wherein when said first value for said at least one parameter is negotiated to said valid value, said second value in said second negotiation message is set to a value representative of said valid value, wherein said second value is a final or an intermediate result of said negotiation of said at least one parameter.

7. The method according to claim 1, when said at least one parameter is required for said operation of said protocol, said second value is modified to a valid value before responding to said first negotiation message.

8. An apparatus comprising:
at least one processor; and
at least one memory including computer program code, the at least one processor, the at least one memory, and the computer program code configured to cause the apparatus to at least:
receive a first negotiation message from a first protocol entity that carries a first value for at least one parameter of a protocol that is operated between said first protocol entity and a second protocol entity, wherein said first value is an invalid value for said at least one parameter, and wherein said invalid value is not allowed by said protocol;
check whether said at least one parameter is required for operation of said protocol; and
send a second negotiation message to said first protocol entity that carries a second value for said at least one parameter in response to receiving said first negotiation message, wherein said second negotiation message is configured to prevent a termination or an interruption of a negotiation of said at least one parameter of said protocol that is operated between said first protocol entity and said second protocol entity, wherein said second value is set to a value representative of said first value when said at least one parameter is not required for said operation of said protocol.

9. The apparatus according to claim 8, wherein said first value is a default value or a user-defined value for said at least one parameter.

10. The apparatus according to claim 8, wherein the apparatus is further configured to at least check whether said first value for said at least one parameter may be negotiated from said invalid value to a valid value, wherein said valid value is allowed by said protocol.

11. The apparatus according to claim 8, wherein said protocol is a radio link protocol.

12. The apparatus according to claim 11, wherein said first negotiation message is exchange identification command, and wherein said second negotiation message is an exchange identification response.

13. The apparatus according to claim 10, wherein when said first value for said at least one parameter is negotiated to said valid value, said second value in said second negotiation message is set to a value representative of said valid value, wherein said second value is a final or an intermediate result of said negotiation of said at least one parameter.

14. The apparatus according to claim 8, wherein the apparatus is further configured to at least modify, when said at least one parameter is required for the operation of said protocol, said second value to a valid value before responding to said first negotiation message.

15. A non-transitory computer-readable medium encoded with instructions that, when executed by at least one processor, performs at least the following:

receive a first negotiation message from a first protocol entity that carries a first value for at least one parameter of a protocol that is operated between said first protocol entity and a second protocol entity, wherein said first value is an invalid value for said at least one parameter, and wherein said invalid value is not allowed by said protocol;

check whether said at least one parameter is required for operation of said protocol; and send a second negotiation message to said first protocol entity that carries a second value for said at least one parameter in response to receiving said first negotiation message, wherein said second negotiation message is configured to prevent a termination or an interruption of a negotiation of said at least one parameter of the protocol that is operated between said first protocol entity and said second protocol entity, wherein said second value is set to a value representative of said first value when said at least one parameter is not required for said operation of said protocol.

16. The non-transitory computer-readable medium according to claim 15, wherein said first value is a default value or a user-defined value for said at least one parameter.

17. The non-transitory computer-readable medium according to claim 15, further comprising:

checking whether said first value for said at least one parameter may be negotiated from said invalid value to a valid value, wherein said valid value is allowed by said protocol.

18. The non-transitory computer-readable medium according to claim 15, wherein said protocol is a radio link protocol.

19. The non-transitory computer-readable medium according to claim 18, wherein said first negotiation message is an exchange identification command, and wherein said second negotiation message is an exchange identification response.

20. The non-transitory computer-readable medium according to claim 15, further configured to at least modify, when said at least one parameter is required for the operation of said protocol, said second value to a valid value before responding to said first negotiation message.

* * * * *

UNITED STATES PATENT AND TRADEMARK OFFICE
CERTIFICATE OF CORRECTION

| | | |
|---|---|---|
| PATENT NO. | : 8,638,813 B2 | Page 1 of 1 |
| APPLICATION NO. | : 11/587523 | |
| DATED | : January 28, 2014 | |
| INVENTOR(S) | : Ala-Vannesluoma | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,337 days.

Signed and Sealed this
First Day of December, 2015

Michelle K. Lee
*Director of the United States Patent and Trademark Office*